United States Patent [19]
Bellare et al.

[11] Patent Number: 5,999,625
[45] Date of Patent: Dec. 7, 1999

[54] METHOD FOR ELECTRONIC PAYMENT SYSTEM WITH ISSUER CONTROL

[75] Inventors: Mihir Bellare, San Diego, Calif.; Juan Alberto Garay, Yonkers, N.Y.; Charanjit Singh Jutla, Elmsford, N.Y.; Marcel Mordechay Yung, New York, N.Y.

[73] Assignee: International Business Machines Corporation, Armonk, N.Y.

[21] Appl. No.: 08/807,167

[22] Filed: Feb. 27, 1997

[51] Int. Cl.⁶ ........................................................ H04L 9/00
[52] U.S. Cl. ................................ 380/24; 380/23; 380/25; 705/39
[58] Field of Search .................................. 380/25, 21, 24, 380/23; 705/41, 44, 42, 43, 39

[56] References Cited

PUBLICATIONS

Version 3.0. Keywhole Saler Management Application Software Announced by Softkey Software Products, Magazine, Dec. 1987.
S. Brands, Untraceable Off–line Cash in Wallet With Observers Crypto Conference, Aug. 1993.
James, McAndrews, Making Payments on the Internet Philadelphia Business Review, pp. 3–14, Jan., Feb. 1997.
Electric Payment Systems, Donal O'Mahony, Michael Peirce, Hitesh Tewari, 146–160, Oct. 1995.

*Primary Examiner*—Gail O. Hayes
*Assistant Examiner*—Ho S. Song
*Attorney, Agent, or Firm*—Whitham, Curtis & Whitham; Douglas W. Cameron

[57] ABSTRACT

A cryptographic method implemented on an electronic communication network interconnecting a plurality of terminals represents funds in a way that is secure at the issuer and secure when funds move from payer to payee and back to the issuer. The cryptographic method mints, issues, pays and redeems funds when transactions are done over the network with the flow and transaction of funds being controlled by an issuer. The method implements electronic money acquisition, transfer of money between users in an unrestricted way and in a way where fraud is impossible cryptographically, and redemption of electronic money to correct real money bank accounts. Funds are handled so that their representation enables the issuer to treat the representation as a physical monetary instrument equivalent to notes or coins.

12 Claims, 12 Drawing Sheets

TRIPLE-DES MAC-TAG ABOVE IS COMPUTED USING A SECRET KEY K1 OF THE MINT.

- KEYS

| $PK_X, SK_X$ | PUBLIC AND SECRET KEY OF PARTY X |
|---|---|
| $CERT_X$ | PUBLIC KEY CERTIFICATE OF PARTY X, ISSUED BY CA. WE ASSUME IT INCLUDES X, $PK_X$ AND CA'S SIGNATURE ON $PK_X$. |

- CRYPTOGRAPHIC PRIMITIVES:

| $H(\cdot)$ | A STRONG COLLISION-RESISTANT ONE-WAY HASH FUNCTION. THINK OF $H(\cdot)$ AS RETURNING "RANDOM" VALUES. |
|---|---|
| $E_X^*$ | PLAINTEXT-AWARE PUBLIC KEY ENCRYPTION USING $PK_X$. |
| $S_X(\cdot)$ | DIGITAL SIGNATURE WITH RESPECT TO $SK_X$. NOTE THE SIGNATURE OF MESSAGE M DOES NOT INCLUDE M. WE ASSUME THE SIGNATURE FUNCTION HASHES THE MESSAGE BEFORE SIGNING. |
| $e_K$ | SYMMETRIC KEY BASED ENCRYPTION ALGORITHM, TAKING KEY K AND A PLAINTEXT, AND PRODUCING THE CIPHERTEXT. |
| $mac_K$ | SYMMETRIC KEY BASED SIGNATURE, OR MESSAGE AUTHENTICATION CODE (MAC), TAKING KEY K AND A PLAINTEXT, AND RETURNING A SHORT TAG. |

FIG.3

- FIELDS:

| P-DESC | PURCHASE DESCRIPTION– AMOUNT, DESCRIPTION OF GOODS, PAYMENT METHOD OR MECHANISM. ASSUMED PART OF STARTING INFORMATION OF PAYER AND PAYEE. |
|---|---|
| $TID_{PY}$ | TRANSACTION ID– A NUMBER GENERATED BY THE PAYEE WHICH IS UNIQUELY ASSOCIATED TO THIS TRANSACTION. |
| Common | P-DESC, $TID_{PY}$, $ID_{PA}$, $ID_{PY}$, $ID_I$ |
| V-DESC | VERIFICATION AND EXECUTION REQUEST TEXT. INDICATES ONE OF THREE OPTIONS (REFRESH, IMMEDIATE REDEEM, OR AGGREGATE) AND PROVIDES CORRESPONDING DATA. |
| $K_X$ | RANDOM NUMBER CHOSEN BY PARTY X. |
| K | $K_{PY} \oplus K_I$ |

- PROTOCOL FLOWS:

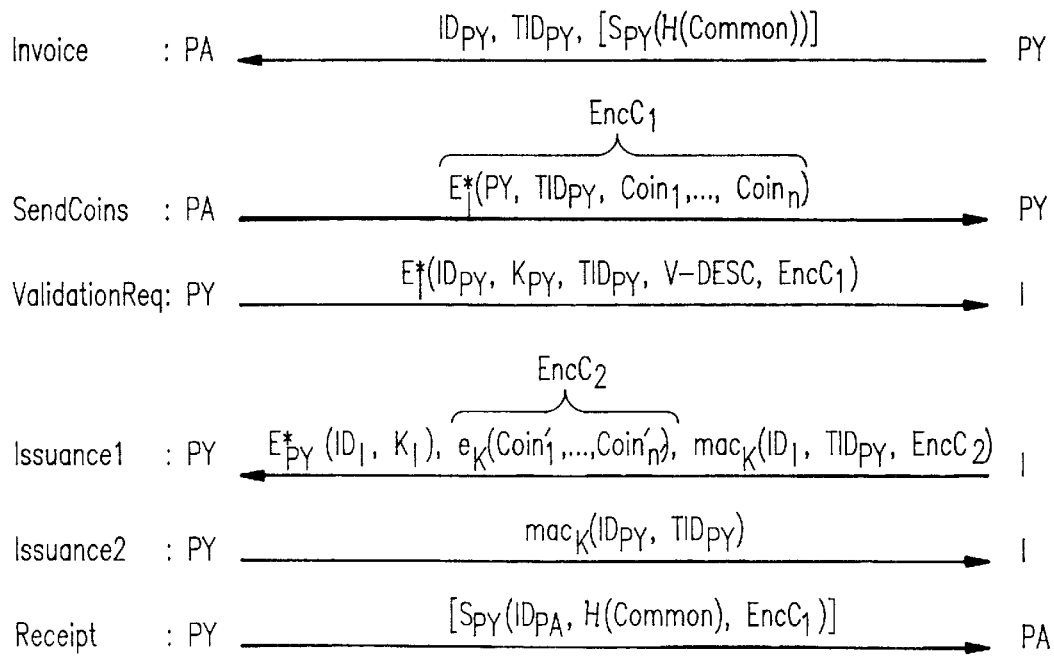

FIG.5

- FIELDS:

| | |
|---|---|
| P-DESC | PURCHASE DESCRIPTION- AMOUNT, DESCRIPTION OF GOODS, PAYMENT METHOD OR MECHANISM. ASSUMED PART OF STARTING INFORMATION OF PAYER AND PAYEE. |
| $TID_{PY}$ | TRANSACTION ID- A NUMBER GENERATION BY THE PAYEE WHICH IS UNIQUELY ASSOCIATED TO THIS TRANSACTION. |
| Common | P-DESC, $TID_{PY}$, $ID_{PA}$, $ID_{PY}$, $ID_I$ |
| V-DESC | VERIFICATION AND EXECUTION REQUEST TEXT. INDICATES ONE OF THREE OPTIONS (REFRESH, IMMEDIATE REDEEM, OR AGGREGATE) AND PROVIDES CORRESPONDING DATA. |
| R2-DESC | INFORMATION IN ACH RECEIPT FROM ISSUER TO MERCHANT. INCLUDES GROSS AMOUNT SUBMITTED, FEE, NET AMOUNT CREDITED, AND A TRANSACTION ID. |
| $K_X$ | RANDOM NUMBER CHOSEN BY PARTY X. |
| K | $K_{PY} \oplus K_I$ |

- PROTOCOL FLOWS:

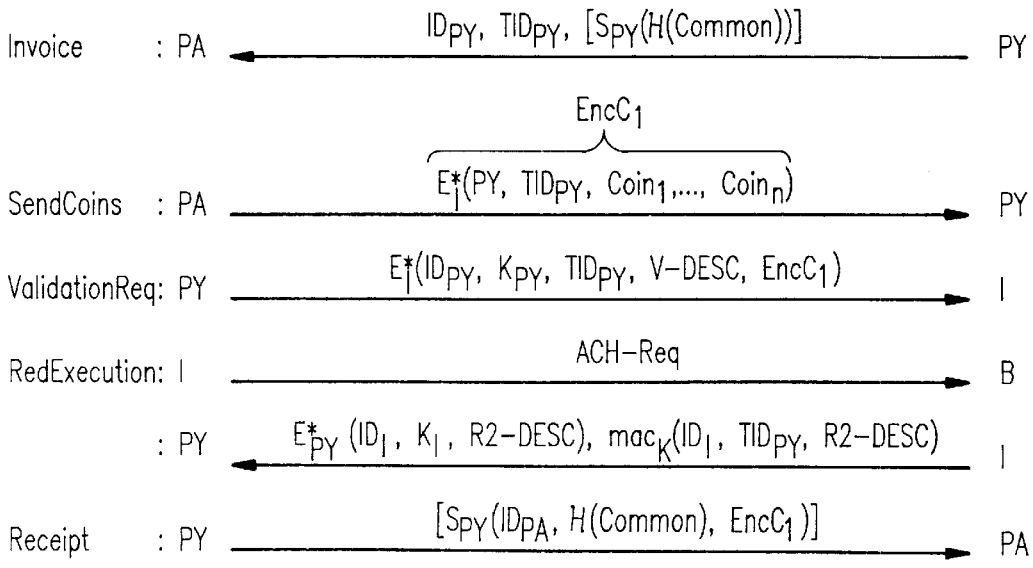

FIG.7

- FIELDS:

| C-DESC | CHANGE DESCRIPTION- DENOMINATIONS OF DESIRED COINS |
|---|---|
| $R_X$ | RANDOM CHALLENGE CHOSEN BY PARTY X |
| $K_X$ | RANDOM NUMBER CHOSEN BY PARTY X |
| $K$ | $K_{Ch} \oplus K_I$ |

- PROTOCOL FLOWS:

CRequest : Ch $\xrightarrow{E_I^*(ID_{Ch}, K_{Ch}, R_{Ch}, C\text{-}DESC, Coin_1, ..., Coin_n)}$ Issuance1 : Ch $\xleftarrow{E_{Ch}^*(ID_I, K_I, R_I, R_{Ch}, Coin'_1, ..., Coin'_{n'})}$ Issuance2 : Ch $\xrightarrow{mac_K(ID_{Ch}, R_I)}$

FIG.9

- FIELDS

| | |
|---|---|
| R1-DESC | REDEMPTION DESCRIPTION- INFORMATION AND AUTHORIZATION REQUIRED TO MAKE DEPOSIT AT BANK. |
| R2-DESC | INFORMATION IN ACH RECEIPT FROM ISSUER TO MERCHANT. INCLUDES GROSS AMOUNT SUBMITTED, FEE, NET AMOUNT CREDITED, AND A TRANSACTION ID. |
| $R_X$ | RANDOM CHALLENGE CHOSEN BY PARTY X |
| $K_X$ | RANDOM NUMBER CHOSEN BY PARTY X |
| $K$ | $K_{RD} \oplus K_I$ |

- PROTOCOL FLOWS:

$$\text{RedRequest}: \quad RD \xrightarrow{\overbrace{E_I^*(ID_{RD},\ K_{RD},\ R_{RD},\ R1\text{-}DESC,\ Coin_1,\dots,\ Coin_n)}^{Data}} I$$

$$\text{RedExecution}: \quad I \xrightarrow{ACH\text{-}Req} B$$

$$\text{RedAck}: \quad RD \xleftarrow{E_{RD}^*(ID_I,\ K_I,\ R2\text{-}DESC),\ mac_K(ID_{RD},\ R_{RD},\ R2\text{-}DESC)} I$$

FIG.11

METHOD FOR ELECTRONIC PAYMENT SYSTEM WITH ISSUER CONTROL

BACKGROUND OF THE INVENTION

1. Field of the Invention

The present invention generally relates to an electronic communication network having a plurality of terminals in which a user may acquire electronic money, spend it or transfer it to other users of the network, and redeem the electronic money by transferring it to a regular bank account and, more particularly, to a mechanism that assures that the electronic money is properly and securely circulated.

2. Background Description

Commercial Internet payment systems are now being developed. Just as cash and credit exist in conventional business transactions, both exist in the digital world as well. Digital cash is the digital equivalent of a cashier's check issued and signed by a bank or other institution with its name, unique identification (ID) and amount of money represented. Users can buy these notes or, as used in this description, coins from a bank and then redeem them later for real cash, typically as a deposit to a bank account. Although users can make digital copies of such notes, a bank redeems each note number only once.

Several examples of Internet payment systems already exist. Many of these systems are account-based; that is, both the customer and the merchant have accounts with the system. Thus, there is no provision for anonymity. Privacy is an important issue which is only partially addressed in some systems. Security is critical to all Internet payment systems, and the encryption techniques adopted vary widely.

While not an exhaustive list, examples of Internet payment systems include DigiCash of Amsterdam, The Netherlands, CyberCash of Reston, Va., and systems proposed by various banks including Citibank of New York, N.Y. DigiCash provides a close analogue to real cash in the sense of providing unconditional anonymity for the user through a novel cryptographic technique known as "blind signatures" designed by the founder of the company, David Chaum. CyberCash offers both a credit card and a money payment service. Transactions using CyberCash are passed directly to a real bank. The Citibank system is an off-line system. All participants (banks and users) have so-called "money modules" which are assumed to be secure, as is the communication between them. However, this approach has scalability and security problems.

SUMMARY OF THE INVENTION

It is therefore an object of the present invention to provide a cryptographic method for representing funds in a way that is secure at the issuer and secure when funds move from payer to payee and back to the issuer.

It is another object of the invention to provide a cryptographic method for minting, issuing, paying and redeeming funds when transactions are done over an open network of communicating computers with the flow and transaction of funds being controlled by an issuer.

According to the invention, there is provided a method which implements electronic money acquisition, transfer of money between users in an unrestricted way and in a way where fraud is impossible cryptographically, and redemption of electronic money to correct real money bank accounts. The method according to the invention handles funds so that their representation enables the issuer to treat the representation as a physical monetary instrument equivalent to notes or coins.

In a preferred embodiment of the invention, a plurality of user terminals are interconnected in an open electronic communications network. This network includes an issuer terminal which participates in every transaction. Funds are exchanged between user terminals by transmitting a request to a payer terminal for funds to be exchanged between a payer and a payee terminal. A message is transmitted to the issuer terminal where the message is encrypted such that the content of the message can only be interpreted by the issuer terminal. The message, when decrypted, indicates a value of said funds to be exchanged between the payer and payee terminals. A database of valid fund representations is maintained by the issuer terminal. Each fund representation has an associated unique identification (ID) where a single use of a fund representation associated with a unique fund ID results in an indication in the database that the fund representation may no longer be used. The issuer terminal determines if the message is valid. The message is valid if a unique fund ID associated with the message is in the database. A request is rejected if the message is determined to be invalid. If the message is determined to be valid, a new fund representation is transmitted to the payee terminal. This new fund representation represents funds to be transferred to the payee. The new fund representation along with its unique fund ID is stored in said database, where the new fund representation can only be interpreted and used by the payee terminal.

The present invention provides the right balance between functionality, security and user privacy and is characterized by the following features:

"Trust-based" anonymity: The issuer commits itself to protecting the user's privacy (the user can register with a pseudonym), but if needed, traceability can be enforced.

Security: Protocols are implemented using a combination of public and shared-key technologies, striking a balance between efficiency and security guarantees for the parties involved.

Issuer Control: In network, or on-line, transactions, the issuer participates in every transaction, thus providing issuer control.

Robust issuer design: Functions are separated, providing tamper-resistant mint, tamper-resistant signature generation, and other advanced features, such as batch signature verification.

Transferability of coins: Coins can be freely transferred without any specific payment purpose.

BRIEF DESCRIPTION OF THE DRAWINGS

The foregoing and other objects, aspects and advantages will be better understood from the following detailed description of a preferred embodiment of the invention with reference to the drawings, in which:

FIG. 3 is a table showing keys and cryptographic primitives used in the protocols;

FIG. 5 is a flow diagram showing the flows in the payment with refresh protocol;

FIG. 7 is a flow diagram showing the flows in the payment redemption protocol;

FIG. 9 is a flow diagram showing the flows in the change protocol;

FIG. 11 is a flow diagram showing the flows in the redemption protocol;

DETAILED DESCRIPTION OF A PREFERRED EMBODIMENT OF THE INVENTION

Parties and Roles

Participant—A generic name for a party involved in the system.

Issuer—A unique party who issues coins.

Coin-holder—A party who holds coins or has the potential to do so.

Payee—A party who is willing to accept coins as payment. A payee who can aggregate coins is also called a merchant.

Bank—Some number of banks will be involved in moving to and fro between electronic and real money.

Certification Authority—An optional party who can certify public keys of participants.

A participant can play many roles. Thus, a coin-holder can play the following roles:

Coin Purchaser—purchases coins from an issuer.

Redeemer—turns coins into real money.

Payer—a customer who pays for goods with coins.

Refresher—get new coins for old.

Changer—make change.

Refund Seeker—One seeking a refund.

Also, a participant can be one of the following:

Registerer—registers a public key at the issuer.

Enroller—Enrolls for a particular role such as coin purchaser or merchant.

Note that parties and roles are not mutually exclusive. For example, a merchant who is paid can thereby become a coin holder.

All participants have identities, and all will have public keys. The issuer has a database listing the identities of all participants, and, for each one, its public key. (This information is formed at the time of registration.) In all transactions directly involving the issuer, there is thus no certification authority needed. However, the design leaves an option for an external certification authority. This is likely to be useful in some processes in order to provide functionality which is likely to be desired by participants. For example, in the payment process, the payer might like a receipt from the payee that the coin was received and accepted. This needs a signature of the payee, and thus certification of the payee public key. Thus, it is preferred that the software have an optional capability of accepting external public key certificates.

Coins and Terms

Figure 1:
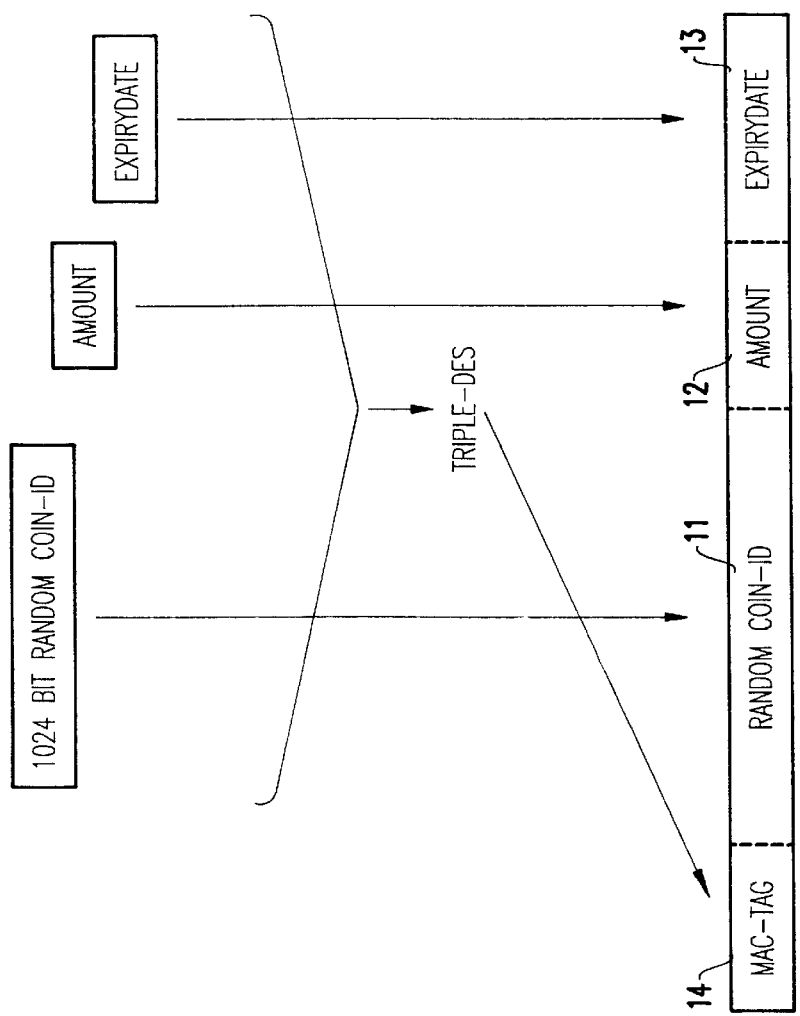
FIG. 1 is a block diagram showing the structure of an un-encrypted coin according to the invention.

Referring now to the drawings, and more particularly to FIG. 1, there is shown a schematic representation of an un-encrypted coin. A coin is an object consisting of some unique identifier 11 (e.g., serial number, counter) called the coin ID, an indication of value (denomination) 12, an expiry date 13, and an authenticating cryptographic tag. In the example illustrated, the coin ID 11 is a 1024 bit random number. The tag 14 is a MAC, or message authentication code, on the other fields of the coin (coin ID 11, denomination 12, expiry date 13), computed using a symmetric key (a random number chosen by the issuer) which is kept in secret by the issuer. Thus, the issuer can compute and verify the tag; however, no other party can compute a valid tag. (Valid means one that the issuer, using the secret key, would accept as valid.) Note that because it is secret key based, the tag cannot even be checked by anyone except the issuer; i.e., this is not a digital signature. This is done for efficiency reasons. Symmetric key based cryptography is hundreds of times more efficient.

The cost of successful tag forgery is enormous, since if an adversary could forge tags, he or she could manufacture counterfeit coins at will. To minimize the possibility of successful tag forgery, the preferred embodiment of the invention implements the following:

First, the tag is computed in protected, tamper-proof hardware. This minimizes the risk of loss of the secret key.

Second, the tag-computing algorithm is strong. One can, of course, use MACs based on existing primitives like DES (triple DES being one alternative as indicated in FIG. 1). This may be adequate, but it is preferred that, in addition, a proprietary algorithm be used for MAC computation, and this algorithm kept secret. (That is, only the issuer knows the code of the algorithm.) This very much minimizes the risk of forged tags through breaking the algorithm, because breaking the algorithm is significantly harder without knowing the code; e.g., the algorithm may combine DES and other algorithms in a secure way and may use secret strings.

The size of each tag should be 128 bits, so the total tag length is 16 bytes. Outside the cryptographic-module, the tag is encrypted inside the issuer database and it is encrypted over the network. It is only available to the receiver of the coin in a plain form, so that it can later encrypt it to be checked at the cryptographic-module of the issuer against the database coin.

Some protection is also provided by the fact that the coin database is protected. So if an adversary forges a correct tag for a coin which has not yet been issued, it will not help, because the issuer will fail to validate the coin. Thus, the adversary must be able to successfully forge tags of issued, unspent coins in order to gain something.

The coin may have another tag for fast access into the database (according to which the database is organized). A coin can have various states. For example, spent or not, anonymous or not, split and, if so, how, and so forth. These are marked in the database.

The issuer will expect, from a coin purchaser requesting coins, or a change maker wanting change, a specification of exactly what kinds of coins are being requested. The specification takes the form of a list of denominations, and for each denomination, the number of coins of that denomination that is desired. The simplest thing is to just ask for one coin of a certain denomination, for example a single coin of $0.80. But one could ask for, say, (2, $2.50), (1, $1.25), (3, $2), meaning I want two coins of value $2.50 each, one coin of value $1.25, and three coins of value $2. The total value of the list is the total dollar value, or $12.25 in the example just given.

The choice of specification is decided by some combination of the user and his software (purse). There will be a user interface on the purse, enabling specification of lists, etc. (This requires that the cryptographic encrypted purse may be also represented in a user-friendly fashion, and the cryptographic portion of the purse will only be active once the user activates a transaction; i.e., the user's key are revealed and act and then get re-encrypted).

The issuer issues a set of coins as per the specified list. For example, if one asks for one coin of $0.80, he or she will get a single coin of this value. But if one asks for (2, $2.50), (1, $1.25), (3, $2), then he or she will be issued two coins of $2.50, one coin of $1.25, and three coins of $2. Again, the total value of the coin set is of course the total dollar amount, $12.25 in this example.

Databases, Modules, Components

In this section we mention the components that interact with the processes we describe. Briefly, a participant has a purse, which has a database of coins. The issuer has a coin database and a participant database. These indicate the status of a coin, including the withdrawer ID if anonymity was not requested.

Figure 2:
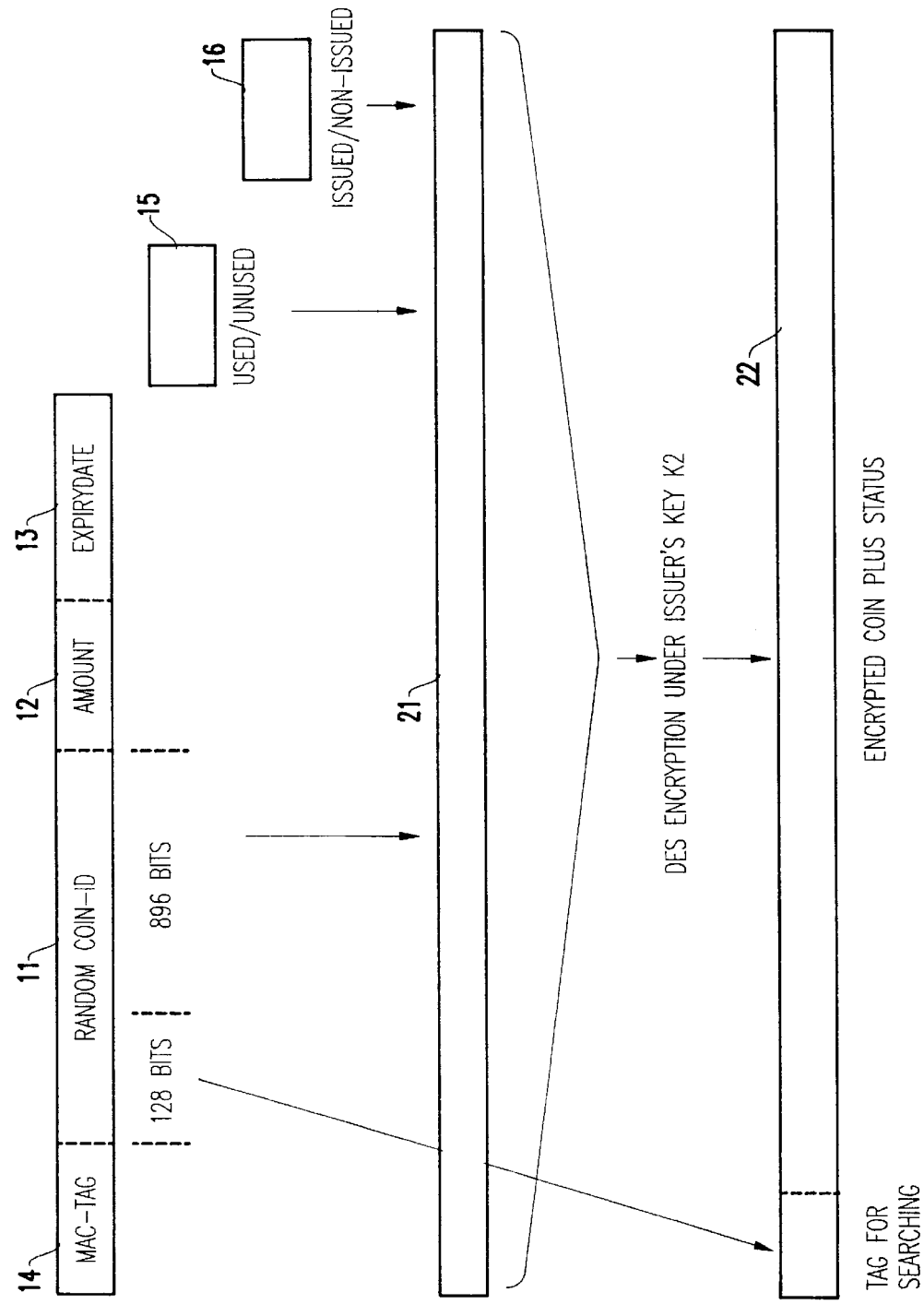
FIG. 2 is a block diagram showing an encrypted coin in the issuer's coin database.

A schematic view of the issuer's coin database is shown in FIG. 2. The un-encrypted coin of FIG. 1 concatenated with the coin's status 21 (e.g., used or unused 15, issued or non-issued 16, etc.) are DES encrypted under the issuer's key K2 to produce the encrypted coin plus status 22. The issuer has a secure crypto module for coin generation. The coin-generation key is hardware-protected inside this module.

List of Processes

The processes, and the parties involved in them, are the following:

Registration—A party chooses an identity, and has his public key registered at the issuer.

Enrollment—An already registered participant enrolls for role such as coin purchaser or redeemer.

Coin Purchase—Coin purchase. The withdrawer specifies what kinds of coins he wants, and a corresponding set of coins is then issued to him, being paid for by funds, of value equal to the total dollar value of the issued coins, which the withdrawer authorizes the issuer to get from his bank account.

Payment—The payer pays to the payee a requested sum, using one or more coins totalling to the requested value. The payee immediately (ie. on-line) validates the coins with the issuer, and may either obtain new coins in return, or redeem the coins, or aggregate them for later redemption.

Change—The coin-holder gives the issuer a set of coins, and also specifies what kinds of coins he wants in change, the total dollar value of the requested coins being the same as that of the provided coins. Coins corresponding to the request are then issued to the coin-holder.

Redeem—The redeemer gives some set of coins to the issuer, and the latter turns them into real money in the redeemer's bank account.

Refresh—The refresher turns in old (expired) coins for an equivalent value in new coins.

Refund—A non-anonymous coin holder can request the issuer to resend him his coins in case his disk crashed.

Adversaries and Attacks

There are two major kinds of attackers: abusers and spoilers. Abusers are trying to get some specific advantage, such as get coins without paying for them, forge or steal coins, etc. Spoilers are not seeking any advantage themselves; they are just trying to harm others. For example, replay a coin purchase request in an attempt to make an unnecessary transfer of funds (from the withdrawer's bank to the issuer). A particular kind of spoiling attack is the denial of service attack in which the attacker tries to tie up issuer resources.

Attackers may be external, i.e., on the Internet lines. Or they may be parties themselves, e.g., a malicious payee or withdrawer trying to get some money for free. Or they may be insiders, such as an employee at the issuer.

Active attackers are the main problem. Pure eavesdroppers are only trying to learn information, such as the nature of a transaction, protecting which is a privacy concern, not directly part of the payment problem.

General Requirements and Principles

A global requirement is conservation of cash. This means that total electronic or digital cash in the system is equal to the total amount of real money that the issuer's logs show is in electronic cash.

A general principle is that any coin representation is seen by at most one participant other than the issuer. Thus, after a issuer issues a coin, the withdrawer is the only one who sees this coin. (When he pays with it, the payee does not see the coin; it is in a digitally sealed envelope which goes straight to the issuer for validation.) This implies "on-line" payments where the issuer is involved in every such transaction. In addition, internal representation of the coin, does not enable insiders with access to its data-base to use it; a coin is checked by a tamper-proof hardware for its validity.

Coins are treated as bearer instruments, like real currency. You have the money if you have a valid coin, no questions asked.

The security requirements that we pursue is of "strong cryptography" which is used to protect financial transactions, the use of "weak cryptography" that relies on weak keys of 40-bit length and passwords only is insufficient for electronic cash. International usage of the system is possible if the encryption is not made "general purpose" but is rather restricted to the use inside the user's software and is not usable otherwise.

It is assumed that monitors and firewalls are used for network protection and trusted tamper-proof devices and physical security is used for internal operation protection. (In the rest of the document we do not treat these aspects of the over-all security architecture).

Cryptographic Terminology and Tools

The protocol design makes use of various cryptographic mechanisms which are summarized here.

The cryptographic primitives used in the protocols are summarized in FIG. 3. All parties have public keys. The issuer has a cache of identities and their corresponding public keys, so that the certification authority is not needed in transactions with the issuer. But it may be needed for other transactions.

The encryption function $E^*_X$ provides, besides secrecy, some form of "message integrity". Decryption of a ciphertext results either in a plaintext message, or in a flag indicating non-validity. Formally, the primitive we use has the property that correct decryption convinces the decryptor that the transmitter "knows" the plaintext that was encrypted. In particular, tampering with ciphertext is detectable. A simple scheme to achieve such plaintext-aware encryption using RSA public key algorithm is described by M. Bellare, P. Rogaway in "Optimal Asymmetric Encryption", *Proceedings of Eurocrypt '94*, May 1994.

We stress that plaintext aware encryption does not provide authentication in the manner of a signature, i.e., it does not provide non-repudiation. But it prevents an adversary from tampering with a ciphertext.

We note that the encryption function is randomized: $E^*$, invoked upon message m will use, to compute its output, some randomizer, so that each encryption is different from previous ones.

The notation $\oplus$ in the following description denotes bitwise exclusive OR (XOR). Besides cryptographic tools one would use monitoring and tracing. Also out-of-band verification and error recovery, for example via telephone, in case of problems.

Processes: Requirements and Protocols

Each process consists of several transactions. A transaction may be one or more protocol flows. (Note: In a single process, the information in the various transaction is not independent, so that thinking of the transactions as atomic is a little misleading.) We assume the user is registered (via a known registration procedure, via certification authority).

Coin Purchase Process

The coin purchase process involves the coin purchaser, the issuer and the coin purchaser's bank. The coin purchaser specifies how much he wants in coins, and in what denominations, and provides the information to make the coin purchase from the bank. The issuer makes the coin purchase and then issues the coins. The following is a list of requirements for this process:

W1—Valid transactions go through.

W2—Can not get coins for nothing. It is not possible to get coins without paying for them. If a party ends up getting a certain dollar value of valid coins, then the issuer has the corresponding funds from the same party's bank account.

W3—Can not create false debits. An adversary may want to play spoiler: it does not want coins, but wants the coin purchaser's account to be unnecessarily debited. This should not be possible. That is, it is not possible for an adversary to create a fake coin request which leads the issuer into debiting the coin purchaser's account.

Figure 4:
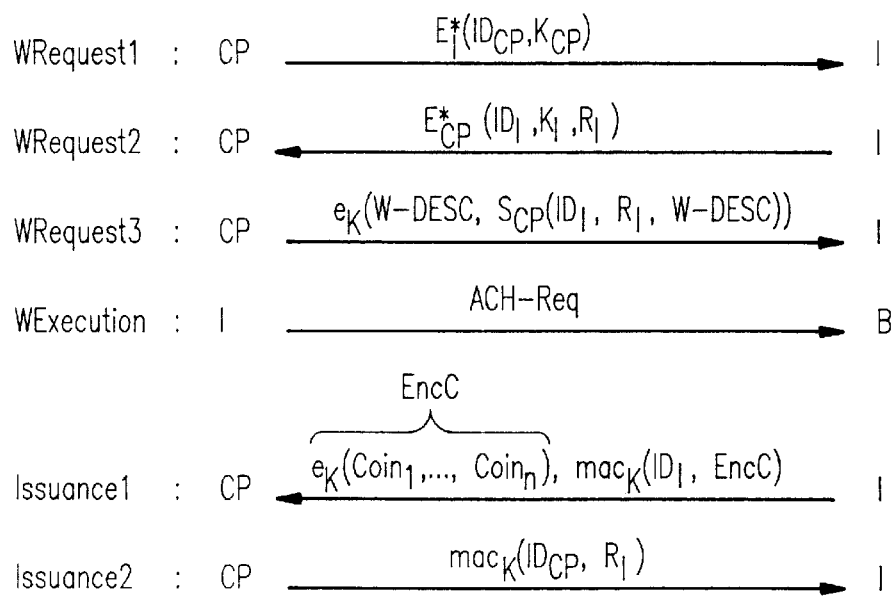
FIG. 4 is a flow diagram showing the flows in the coin purchase protocol.

A protocol for the coin purchase process is shown in the flow diagram of FIG. 4. The field W-DESC contains two things. First, the field contains the type and number of coins he wants. This is a list of denominations, and, for each denomination, the number of coins of that denomination that are desired. Second, the field contains information necessary to enable the issuer to get paid, in real funds of equal value to the total dollar value of the coins. Here we take the case that this payment is made by coin purchase from the coin purchaser's bank, so this information includes the bank name and address, and the coin purchaser's account number. (However, another possibility is that this payment is made by credit or debit card, in which case an iKP-type protocol, e.g., MasterCard & Visa's SET, may be used, instead of the protocol we are describing here. See, for example, M. Bellare, J. Garay, R. Hauser, A. Herzberg, H. Krawczyk, M. Steiner, G. Tsudik and M. Waidner, "iKP—A Family of Secure Electronic Payment Protocols", *Proceedings of the Usenix Electronic Commerce Workshop*, New York, 1995. The issuer would play the role of merchant in these protocols.)

This protocol does not need the certification authority. It assumes that the parties have each other's public keys and certificates already cached. The coin purchaser has the issuer ID and public key in his purse from the enrollment, and similarly the issuer has the coin purchaser ID and public key in his database from enrollment.

Now the coin purchase process and protocol flows are described step by step with reference to FIG. 4. There are three transactions: coin request, in which the coin purchaser asks for coins and provides the bank information; execution, in which the ACH transaction is done; and finally, issuance of coins. The protocol is designed to guarantee both privacy and authenticity of the data. This is to protect the coin purchase information and the coins that are issued. It must also provide freshness. For efficiency's sake we use a key exchange protocol to get a session K under which later messages are encrypted or MACed. However, the coin purchase information is digitally signed for non-repudiability.

(1) Coin Request. The coin purchaser requests that a certain amount in coins be returned to him, and authorizes the issuer to withdraw this amount from his bank account. The protocol begins with a key exchange which issues the key $K=K_{CP}\oplus K_1$ to both parties, CP is the coin purchaser and I is the issuer:

WRequest1. The coin purchaser chooses a random number $K_{CP}$, and then encrypts his identity $ID_{CP}$ and $K_{CP}$ under the public encryption key of the issuer, using the plaintext aware encryption algorithm. The ciphertext is passed to the issuer.

WRequest2. The issuer applies the plaintext aware decryption algorithm to the received ciphertext. If this algorithm rejects the text as non-authentic then he rejects; else he obtains and records the identity $ID_{CP}$ of the withdrawer and $K_{CP}$. Now he chooses a random number $K_1$ and also a random nonce $R_1$. He uses $ID_{CP}$ to retrieve $PK_{CP}$ and then encrypts $ID_1$, $K_1$, $R_1$ under $PK_{CP}$ using the plaintext aware encryption algorithm. The ciphertext is sent to the coin purchaser. The value $K=K_1\oplus K_{CP}$ is stored as the session key.

WRequest3. The withdrwawer applies the plaintext aware decryption algorithm to the received ciphertext. If this algorithm rejects the text as non-authentic then he rejects; else he obtains and records the identity $ID_1$, and the numbers $K_1$, $R_1$. He checks that the identity is really that of the issuer by matching it with the value in his purse. He forms the session key $K=K_{CP}\oplus K_1$. Now he forms the indicated flow, which contains W-DESC and a signature, the whole encrypted under the shared session key K to ensure privacy of the bank coin purchase information. Note the nonce $R_1$ is included in the signature to ensure freshness.

(2) Execution. The issuer now uses the coin purchase information and authorization provided by the customer to make the ACH transaction of coin purchase from the bank.

WExecution. The coin purchaser uses K to decrypt the ciphertext and obtain W-DESC and the signature. He checks that the signature is valid, and stores it. Now he uses the information in W-DESC to make the ACH request. The issuer then waits a suitable period, which can range up to two days. If there is anything wrong, the bank sends a reject within this period; else the funds are in the issuer account. Now the issuer is ready to issue the coins.

(3) Issuance. The issuer forms or retrieves coins $Coin_1, \ldots, Coin_n$ of the denominations requested in W-DESC. (These coins may have been created earlier and are archived, or may be formed at this time.) Then:

Issuance1. The issuer encrypts the coins under the session key K to get EncC. This ciphertext is then authenticated, also under K, by computing $mac_K(ID_1, EncC)$. The ciphertext and the MAC are sent to the coin purchaser.

Issuance2. The coin purchaser checks that the MAC is correct. (This means the coins are really from the issuer.) Then he decrypts the ciphertext to get the coins, which go into the purse. He now issues a final acknowledgment, consisting of the issuer nonce $R_1$ MACed under the session key.

Payment Process

The payment protocol involves the payer (customer), the payee (merchant) and the issuer. The requirements are as follows:

P1—Valid payments go through. If the payer transfers a certain amount in valid coins, and if these coins are as yet unspent, then, after checking with the issuer, the payee accepts the payment. (He may end up with refreshed coins, or have redeemed them, or aggregated, as he wishes.)

P2—Accepted payments are valid. If after checking with the issuer a payee accepts a payment, then he knows that the refreshed coins he has obtained are valid. In particular, already spent coins are detected: If a payer uses an already spent coin then (by checking with the issuer) the payee will detect it, and the payee will not accept the payment.

P3—Payment is for the goods or services the parties have agreed on. An adversary A cannot divert a payment by the payer to A's advantage, or even change the order description in "spoiler" ways. This is an optional requirement, which can be provided given an external certification authority.

P4—Payer is informed of double spending. In case the issuer detects double spending, the payer should be told his coins are bad, and be sure that the issuer thinks so.

Figure 6:
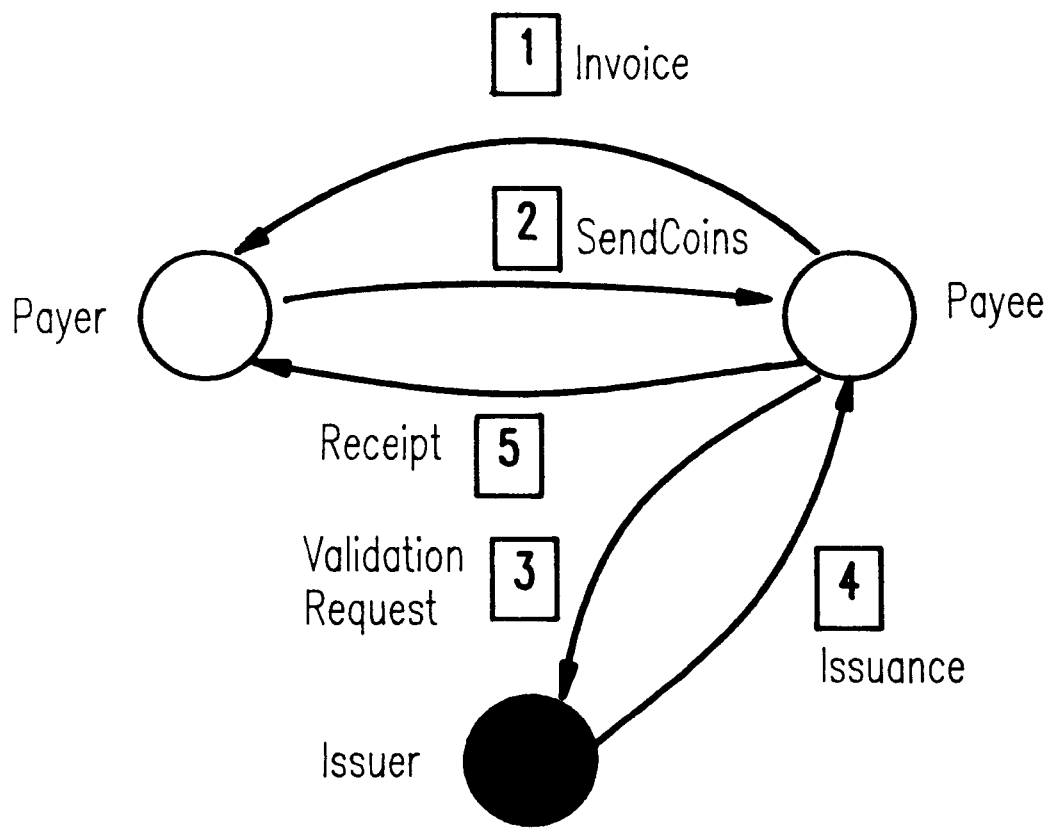
FIG. 6 is a schematic diagram illustrating the flows in payment process with refresh.

Two protocols are provided; payment with refresh and payment with redemption. These are shown in the flow diagrams of FIGS. 5 and 7, respectively. The corresponding data flows are illustrated schematically in FIGS. 6 and 8, respectively. The V-DESC field indicates which option is being used. In addition, it includes whatever information is needed for the option being used. For example, if it is refresh, the V-DESC field includes the type and number of the desired coins; if it is redemption, the V-DESC field includes the bank name, address and the account number.

The payment protocols have certain optional flows. They are indicated in square brackets, for example $[(S_{PY}\text{-}H(Common))]$ means providing this signature in the Invoice flow of FIG. 5 is an option. The issue here is certificates. The basic protocol does not need a certification authority. It is enough that the issuer has the public keys of the participants. But for the extra functionality of order protection and receipt, an external certification authority is needed to provide the payer with the public key of the payee. We now describe how the flows are computed with reference to FIGS. 5 and 6 and FIGS. 7 and 8.

(1) Invoice. This transaction consists of a single flow in which the payee provides the transaction ID. The latter is a randomly chosen number which uniquely identifies the transaction. For confirmation of amount and order information, it is suggested that this be accompanied by a signature of the common information.

(2) SendCoins. The payer picks from his purse a collection of coins $Coin_1, \ldots, Coin_n$, whose total dollar value equals the amount to be paid. (If the purse happens to not currently hold this amount, but holds coins of total dollar value which is larger, the payer can go through a change transaction to get change, and then resume the payment. If the purse has insufficient funds, the payer will have to make a coin purchase, and, since this is a lengthy process, he will probably stop the payment here and re-start when he has the funds.) The coins are put in an envelope by encrypting them (and the identity of the payee) under the public key of the issuer. The ciphertext is transmitted to the payee.

(3) Validation Request. The payee cannot open the envelope; he never sees the coins. Instead, he forwards them to the issuer for validation, along with V-DESC which indicates whether he wants refresh, redemption or aggregation. This is done, for privacy, under cover of an encryption under the issuer's public key. Also in the scope of the encryption go the payer identity, the transaction id, and a number $K_{PY}$ chosen at random, which will be used to derive a session key.

At this point the process is different depending on whether we are doing refresh or redeem. We continue to describe the refresh case with reference to FIGS. 5 and 6, and then briefly describe the redeem casee afterwards.

(3) Issuance. The issuer decrypts the ciphertext to obtain $ID_{PY}$, $K_{PY}$, $TID_{PY}$, V-DESC, $EncC_1$. He then decrypts $EncC_1$ to get the coins which were sent by the payee. The validity of these coins is checked. Now new coins are issued, of the type specified in V-DESC, via two flows:

Issuance1. The issuer picks a number $K_1$ at random and forms the session key $K=K_1 \oplus K_{PY}$. The session key, together with IDI, are encrypted under the public key of the payee, and the resulting ciphertext is transferred to the payee. Also the issuer encrypts the new coins under K, then MACs this ciphertext and ID and transaction id as shown. The ciphertext and the MAC are also sent to the payee.

Issuance2. The payee acknowledge having received the new coins by sending a message signed under the session key K.

(4) Receipt. The last flow is optional, and consists of a receipt, from payee to payer, that the payer's payment was accepted by the issuer.

Figure 8:
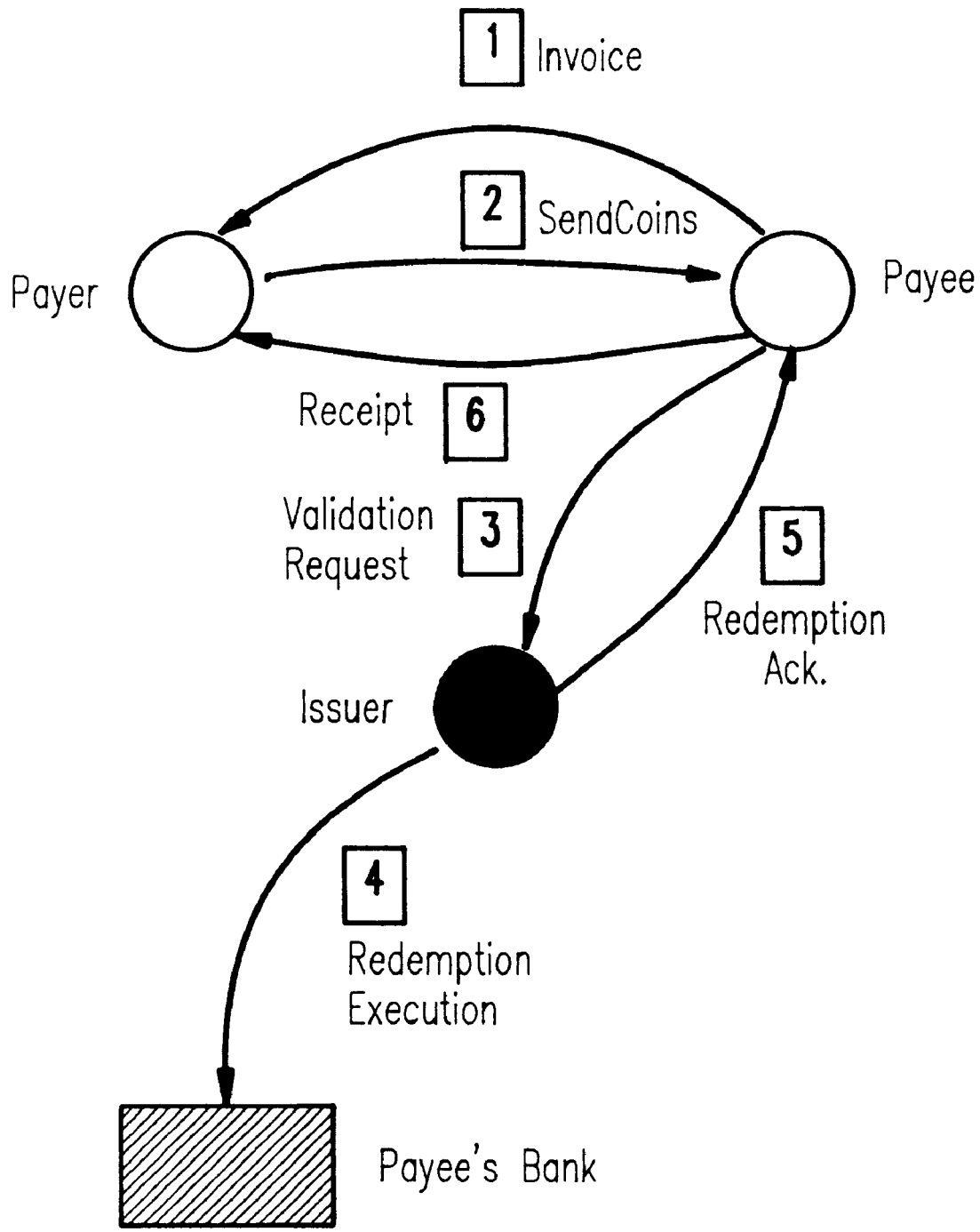
FIG. 8 is a schematic diagram illustrating the flows in the payment process with redemption.

In the payment with redemption, shown in FIGS. 7 and 8, after receiving and checking the validation request, the issuer makes the ACH transaction for the deposit into the payee's account. He acknowledges the receipt of the validation flow and the sending of the ACH transaction by an ACK. But no ACK from the payee is needed in response, so there is one less flow than in the payment with refresh.

In both cases, we have omitted from the protocol picture the flows related to the issuer informing the payer if his coins are bad. (Error conditions are not indicated in the protocols at this time.) We would have the issuer sign the bad coins (or their encryption) and the statement that they are bad, and pass this to the payee, who in turn passes it to the payer.

Change Process

This is the process used by a coin-holder to make change. The coin holder has some number of coins, of various denominations. He can trade them for some other number of coins, of various other denominations, which total to the same dollar amount.

Figure 10:
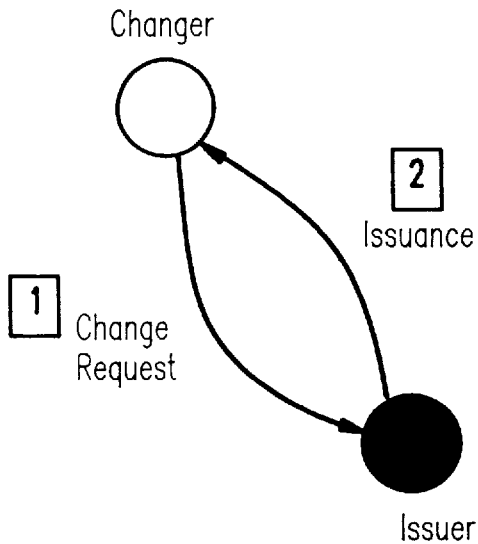
FIG. 10 is a schematic diagram illustrating the flows in the change process.

The protocol is shown in the flow diagram of FIG. 9 and illustrated schematically in FIG. 10. The coin-holder has coins $Coin_1, \ldots, Coin_n$ of total dollar value m. The C-DESC field specifies what kind of change is desired. It is a list of denominations, and, for each denomination, the number of coins of that denomination that are desired, such that the total dollar value of the requested change is m. The flows are as follows:

(1) C-Request. The coin-holder (changer) picks at random a number $K_{Ch}$ and a nonce $R_{Ch}$. He encrypts, under the public key of the issuer, his identity, the two chosen random numbers, and the coins $Coin_1, \ldots, Coin_n$. The ciphertext is transmitted to the issuer.

(2) Issuance. The issuer decrypts the ciphertext to obtain $ID_{Ch}$, $K_{Ch}$, $R_{Ch}$, C-DESC, $Coin_1, \ldots, Coin_n$. He checks that the total dollar value of the requested coins is the same as that of the provided coins. He then either forms the desired coins (of the type and number specified in C-DESC) or retrieves them from his database if they are already formed. Let $Coin'_1, \ldots, Coin'_n$. denote the new coins. The actual issuance consists of two flows:

Issuance1. The issuer picks a random number $K_1$ and a random nonce $R_1$. He then encrypts, under the public key of the refresher IDI, KI, RI, RRf and the new coins Coin'1, ..., Coin'n. The ciphertext is transmitted to the refresher.

Issuance2. The refresher decryupts the ciphertext and checks that the nonce $R_{Rf}$ matches the one he had sent. He checks that the dollar value of the coins is m. He then sends a secure acknowledgment consisting of the MAC, under the key $K=K_{Rf} \oplus K_1$, of his identity and the issuer nonce $R_1$.

The issuer will check the MAC upon receipt.

Figure 12:
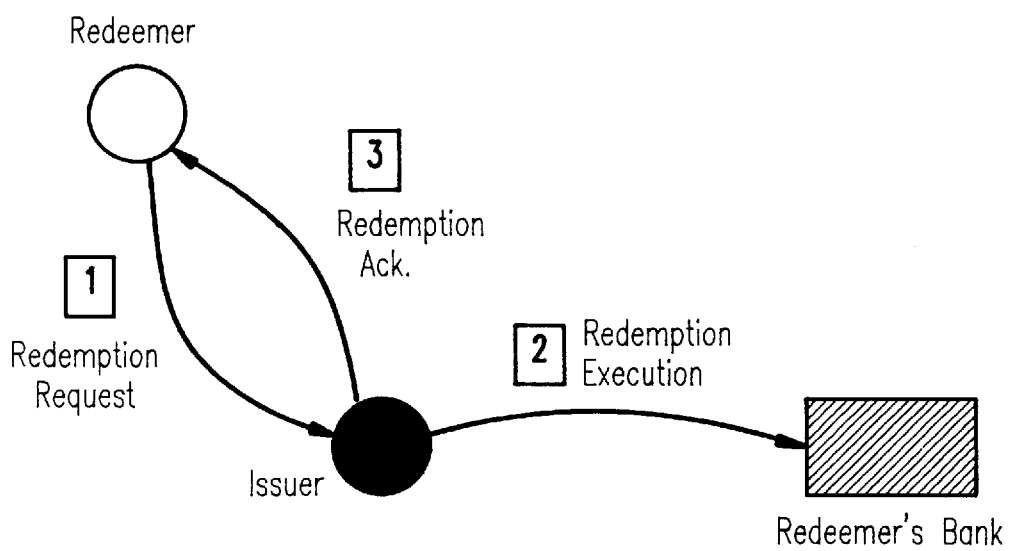
FIG. 12 is a schematic diagram illustrating the flows in the redemption process.

In the redemption process, shown in FIGS. 11 and 12, after receiving and checking the redemption request, the issuer makes the ACH transaction for the deposit into the payee's account. He acknowledges the receipt of the redemption flow and the sending of the ACH transaction by an ACK. But no ACK from the payee is needed in response.

Refund Process

Figure 13:
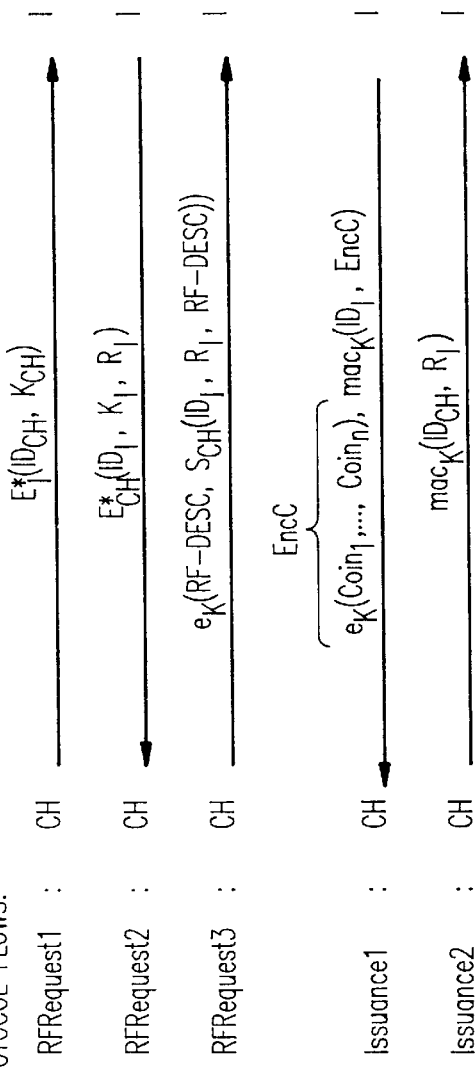
FIG. 13 is a flow diagram showing the flows in the refund protocol.

In this process, a non-anonymous coin-holder's disk containing his purse has crashed, and he requests that the issuer re-issue the un-spent coins. The process is similar to the coin purchase process except that there is no ACH request. Instead, the issuer checks his coin database to determine that the refund request is valid. Namely, using the coin-holder's ID, the issuer checks his coin database to determine that the coin-holder has indeed un-spent coins. The process is shown in FIG. 13.

Conclusion

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. In an open electronic communications network interconnecting a plurality of user terminals and an issuer terminal, a method of exchanging finds between said user terminals comprising the steps of:

transmitting a request for funds to be exchanged between a payer and a payee terminal of said user terminals, said request being transmitted to said payer terminal;

transmitting a message to said issuer terminal, where said message is encrypted such that the content of said message can only be interpreted by said issuer terminal, where said message when decrypted, indicates a value of said finds to be exchanged between said payer and payee terminals;

maintaining a database of valid find representations, each fund representation having an associated unique find identification (ID) and an issued/non-issued field that indicate if a fund representation associated with said unique fund ID is valid, where a single use of a fund representation associated with a unique find ID results in an indication in said database that said find representation may no longer be used;

determining by said issuer terminal if said message is valid where said message is valid if a unique find ID and the issued/non-issued field associated with said message in said database indicate that said message is valid, where said request is rejected and invalid if said unique fund ID or the issued/non-issued field associated with said message in said database indicate that said message is invalid; and if said message is determined to be valid, transmitting a new fund representation to said payee, said new fund representation representing said funds to be transferred to said payee, where said new fund representation along with its unique fund ID and indication in the issued/non-issued field that the fund representation has been issued are stored in said database, where said new find representation can only be interpreted and used by said payee.

2. The method recited in claim 1 wherein fund representations are in the form of electronic "coins" of specified denominations and each of said coins becomes invalid after a predetermined time period following its creation and said database is updated when each of said electronic coins becomes invalid and wherein invalid coins can no longer be used.

3. The method recited in claim 1 wherein said request message further includes an identifier of said payer and a transaction identifier which is generated by said payer.

4. In an open electronic communications network interconnecting a plurality of terminals including an issuer terminal, a payer terminal and a payee terminal, a method of exchanging electronic "coins" between a payer and a payee using said payer and payee terminals respectively, said method comprising the steps of:

transmitting a request message requesting that a first set of electronic coins be transferred from a payer using said payer terminal to a payee using said payee terminal, said request message being transmitted from said payer terminal to said payee terminal over said electronic communications network, each of said electronic coins having a specific identification and a particular currency value, where the total value represented by said coins in said first set represents at least a sum of money to be transferred from said payer to said payee, said request message being encrypted with a public key of said issuer terminal;

transmitting a validation request from said payee terminal used by said payee to said issuer terminal, said validation request including said request message and an identification of said payee, said validation request being encrypted under said public key of said issuer terminal;

decrypting said validation request by said issuer terminal using a secret key of said issuer terminal associated with said public key of said issuer terminal, said decryption being done to obtain said first set of coins along with their respective identifications;

validating each of said electronic coins in said first set by said issuer terminal, said each of said electronic coins being validated by checking a unique identification (ID) and an issued/non-issued field associated with said each of said electronic coins in a database maintained by said issuer terminal, where said unique ID and the issued/non-issued field associated with said each of said electronic coins in said database indicate the status of said each of said electronic coins; and if said electronic coins are determined to be valid by said issuer terminal, then changing a status of said unique ID associated with said each of said electronic coins in said first set in said database to indicate that said each of said electronic coins have been used and are no longer available for use, transmitting a response message to said payee terminal, said response message including a second set of electronic coins, where said response message is encrypted under a public key of said payee terminal and where said second set of coins represents said sum of money transferred to said payee, and adding an entry in said database for each of said electronic coins in said second set indicating that said each of said electronic coins in said second set is valid for future use, where said entry is a unique ID and an indication in the issued/non-issued field, wherein only one with knowledge of a secret key associated with said public key of said payee can obtain said coins in said second set for future use.

5. The method recited in claim 4 wherein when a purchaser using a terminal in the network desires to purchase some of said electronic coins for future use further comprising the steps of:

transmitting a purchase request to said issuer terminal for a third set of electronic coins, said purchase request including a number and denominations of said electronic coins in said third set to be purchased by said purchaser, said purchase request also including an authorization to debit a particular bank account of said purchaser; and updating said database to include an entry for each of said electronic coins in said third set indicating that each of said coins in said third set is valid for further use by said purchaser.

6. The method recited in claim 5 wherein said purchase request is encrypted with a session key known only to said purchaser and an issuer using said issuer terminal.

7. In an open electronic communications network interconnecting a plurality of terminals including at least an issuer terminal and a requesting terminal, a method of exchanging electronic coins between said requesting terminal and said issuer terminal comprising the steps of:

transmitting a change request message from said requesting terminal a first set of said coins and a description of a second set of coins, said description including numbers of and denominations of coins in said second set, said change request message being encrypted with the public key of said issuer terminal;

decrypting said encrypted change request message from said requesting terminal with a secret key of said issuer terminal that is associated with said public key of said issuer terminal;

updating a database maintained by said issuer terminal indicating that each coin in said first set is no longer available for further use by said requesting terminal and indicating that each coin in said second set is now available for future use by said requesting terminal, where said database is updated so that a unique identification (ID) associated with said each coin in said first set indicates that said each coin in said first set is no longer available for future use, and so that a unique ID and the issued/non-issued field associated with said each coin in said second set indicate that said each coin in said second set is available for future use; and transmitting a change response message to said requesting terminal, said change response message including said second set of coins, and said change request message being encrypted with a public key of said requesting terminal, wherein said requesting terminal can receive said second set of coins for future use by decrypting said encrypted change response message with a secret key associated with said public key of said requesting terminal.

8. In an open electronic communication network interconnecting a plurality of terminals including an issuer terminal and a requesting terminal, a method of redeeming electronic coins comprising the steps of:

transmitting a redemption request from said requesting terminal to said issuer terminal, said redemption message including a set of electronic coins and a description of an account of a redeemer using said requesting key of said issuer terminal that is associated with said public key of said issuer terminal;

updating a database maintained by said issuer terminal indicating that each coin in said set is no longer available for further use by said requesting terminal, where said database is updated so that a unique identification (ID) and an issued/non-issued field within the database associated with said each coin in said set indicate that said each said coin in said set is no longer available for future use; and crediting the account of said redeemer by a monetary value reflecting the value of said coins in said set of electronic coins.

9. The method as recited in claim 1, wherein the unique fund ID is computed using a key chosen by the issuer.

10. The method as recited in claim 4, wherein the unique ID is computed using a key chosen by the issuer.

11. The method as recited in claim 7, wherein the unique ID is computed using a key chosen by the issuer.

12. The method as recited in claim 8, wherein the unique ID is computed using a key chosen by the issuer.

* * * * *